United States Patent [19]

Furuta

[11] 4,413,290
[45] Nov. 1, 1983

[54] TAPE RECORDER WITH A VOICE SIGNAL RESPONSIVE CIRCUIT

[75] Inventor: Kenji Furuta, Hachioji, Japan

[73] Assignee: Olympus Optical Company Limited, Tokyo, Japan

[21] Appl. No.: 381,466

[22] Filed: May 24, 1982

Related U.S. Application Data

[63] Continuation of Ser. No. 116,763, Jan. 30, 1980, abandoned.

[30] Foreign Application Priority Data

Feb. 2, 1979 [JP] Japan .............................. 54-012542

[51] Int. Cl.$^3$ ...................... G11B 15/02; G11B 19/02
[52] U.S. Cl. .................................... 360/69; 360/74.1; 369/50
[58] Field of Search .................... 360/69, 71, 74.1, 62; 369/50

[56] References Cited

U.S. PATENT DOCUMENTS

| | | | |
|---|---|---|---|
| 3,433,897 | 3/1969 | Munson | 179/100.1 VC |
| 3,647,985 | 3/1972 | Langendorf et al. | 179/100.1 DR |
| 4,000,517 | 12/1976 | Brickerd, Jr. | 360/74.1 |
| 4,120,009 | 10/1978 | Iwasawa | 360/71 |
| 4,130,739 | 12/1978 | Patten | 179/100.1 VC |
| 4,156,797 | 5/1979 | Hoole | 179/1 VC |

Primary Examiner—Alfred H. Eddleman
Attorney, Agent, or Firm—Toren, McGeady and Stanger

[57] ABSTRACT

In the disclosed tape recorder, an auto-off circuit detects whether tape is being advanced and produces a stop signal when the tape has reached its end. A switching arrangement responds to the stop signal to turn off the recording apparatus including the motor. A voice signal responsive circuit produces a go signal which causes the switching arrangement to turn on the recording apparatus in response to a voice signal and causes the switching arrangement to turn the apparatus off in the absence of a voice signal. A selector arrangement switches the switching arrangement so it operates either in response to the auto-off circuit or in response to the voice signal responsive circuit.

7 Claims, 3 Drawing Figures

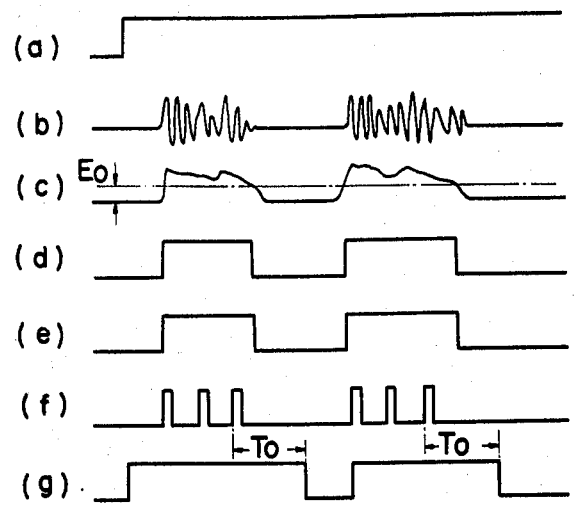
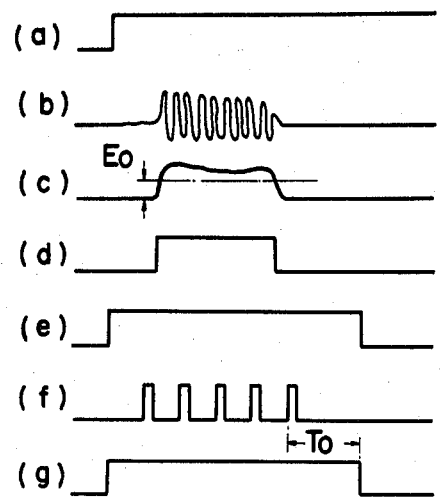

TAPE RECORDER WITH A VOICE SIGNAL RESPONSIVE CIRCUIT

This is a continuation of application Ser. No. 116,763 filed Jan. 30, 1980, now abandoned.

BACKGROUND OF THE INVENTION

1. Field of the Invention

The present invention relates to a tape recorder with a sound actuating circuit, and more particularly to a tape recorder which can compatibly use the switching circuit which connects or disconnects the power source for the auto-off circuit using the tape end method and sound actuating circuit.

2. Description of Prior Art

Recently, some tape recorders have used a so-called sound actuating circuit that starts a motor and operates a recording circuit in response to a sound signal. Such a sound actuating circuit requires a special switching arrangement which connects and disconnects the tape recorder power source in response to the sound signal. This results in the disadvantage of a complicated circuit mechanism.

SUMMARY OF THE INVENTION

An object of the present invention is to eliminate the above-described disadvantage of the tape recorder.

Another subject of the present invention is to provide a tape recorder that can simplify the circuit mechanism by means of such a construction that permits the common use of a power source on-off circuit for both the sound actuating circuit and the tape-end auto-off circuit. In addition, another subject of the present invention is to provide a small-sized tape recorder by reducing the total size.

According to the present invention, the tape recorder consists of a tape recorder itself, a power source, a switching circuit which connects or disconnects the power source to the tape recorder, a sound actuating circuit which, in case of sound input received, simultaneously activates the motor circuit and puts the recording circuit in operation, an auto-off circuit that detects the tape travelling to its end and stops the operation of the device and a switch that serves to control the above-mentioned sound actuating circuit and the above-mentioned auto-off circuit and to regulate the on-off control of the above-mentioned switching circuit. The above-mentioned sound actuating circuit comprises a microphone, above-described amplifying circuit and a rectifier circuit that serves to rectify the output current in the above-mentioned amplifying circuit. Also the above-mentioned auto-off circuit comprises a pulse generator which generates pulses in accordance with the tape travel amount and a retriggerable multi-vibrator circuit which serves to input the pulses.

BRIEF DESCRIPTION OF THE DRAWING

FIG. 2 shows a time chart which serves to illustrate the performance of the above-mentioned embodiment.

FIG. 3 also represents a time chart which serves to illustrate the performance of the embodiment in FIG. 1.

DESCRIPTION OF THE PREFERRED EMBODIMENT

Figure 1:
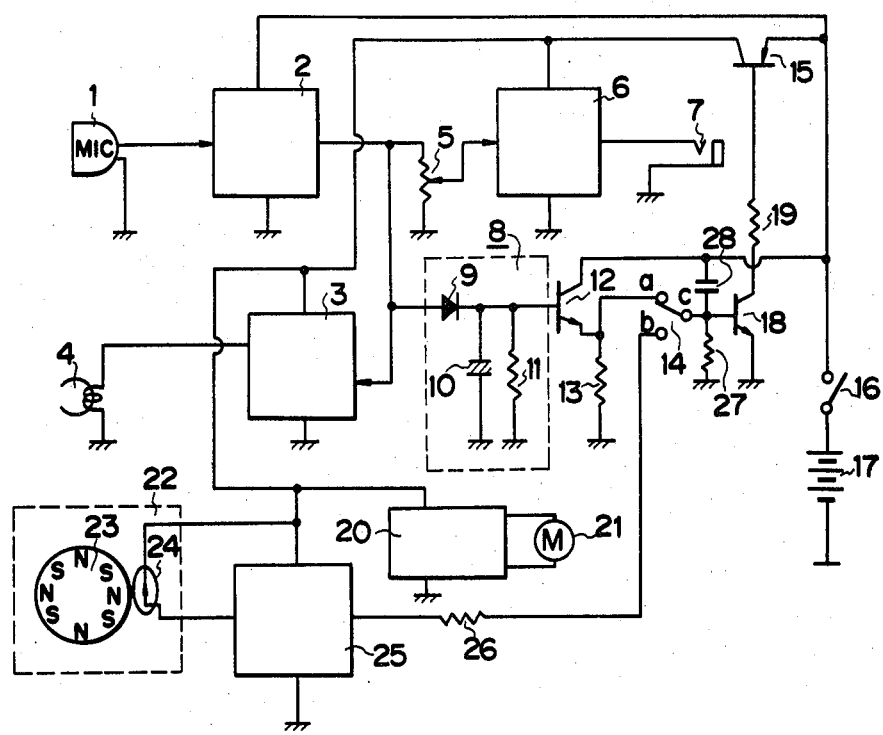
FIG. 1 illustrates the circuit mechanism showing an embodiment of the present invention.

In FIG. 1 a microphone 1 is connected to an amplifying circuit 2. The output terminal of amplifying circuit 2 is connected to recording head 4 by means of recording and bias circuit 3. The output terminal of the above-mentioned amplifying circuit 2 is also connected to earphone jack 7 and speaker (not illustrated) respectively via variable resistor 5 and current amplifying circuit 6. Further, the output terminal of the above-mentioned amplifying circuit 2 is connected to rectifier circuit 8. Rectifier circuit 8 is composed of diode 9, capacitor 10 and resistor 11, for generating an output whose d.c. level varies in accordance with the output from the above-mentioned circuit 2. A switching circuit is composed of transistors 12, 15 and 18 and the output end of rectifier circuit 8 is connected to the base of transistor 12 whose emitter is grounded through a resistor 13 and also connected to the fixed pole of a switch 14. The collector is connected to the emitter of transistor 15 and the power terminal of the above-mentioned amplifying circuit and also to power source 17 through power source switch 16. The moving pole of the above-mentioned switch 14 is connected to the base of transistor 18. The base of transistor 18 is grounded through resistor 27 and also connected to the collector of transistor 12 through capacitor 28 while the emitter is grounded and the collector is connected to the base of the above-mentioned transistor 15 through resistor 19. The collector of transistor 15 is connected to recording and bias circuit 3 and the power source input terminal of power amplifying circuit 6 and at the same time connected to the power source input terminal of motor regulating circuit 20.

Motor regulating circuit 20 serves to regulate the motor 21 so it operates at a rated speed. A pulse generator 22 generates pulses in accordance with amount of tape travel. Pulse generator 22 consists of a finger plate 23 having a permanent magnet which rotates with the travel of the tape and lead switch 24. Pulse generator 22 has an output terminal connected to retriggerable multi-vibrator circuit 25. Multi-vibrator circuit 25 exhibits time constant $T_o$ which is slightly longer than the spacing between pulses generated by the above-mentioned pulse generator 22. Turning on the above-mentioned switch 16 generates an output "1", the above-mentioned pulse generation time retains the above-mentioned output "1" and the cessation of the above-mentioned pulse generation leads to the output "0" after time constant $T_o$. The output terminal of multi-vibrator circuit 25 is connected to the fixed pole of the switch 14 through resistor 26.

The following describes the operation when the moving contact of switch 14 is switched to the fixed pole "a" as illustrated. Turning on power source switch 16 generates the output shown in FIG. 2 (a) at switch 16 and the power source is connected to the above-mentioned amplifying circuit 2. Therefore, if a sound input is applied to microphone 1, sound signal shown in FIG. 2 (b) is generated by the above-mentioned amplifying circuit 2. The sound signal is converted by rectifier circuit 8 into the output whose d.c. level is illustrated in FIG. 2 (c) and applied to the base of transistor 12. If the d.c. input applied to the base of transistor 12 is larger than the total of voltage ($E_o$) between the base emitters of transistor 12 and transistor 18 as shown in FIG. 2 (c), current flows through the transistor 12 and the output illustrated in FIG. 2 (d) is applied to the base of transistor 18 through switch 14. Then, transistor 18 is on and transistor 15 is on, supplying the output shown in FIG. 2 (e) to the recording and bias circuit 3 and motor regulating circuit 20. The output puts motor 21 in operation and the output from the above-mentioned circuit 2, that is the sound signal, is recorded in the tape through recording and bias circuit 3 and recording head 4. Thereafter, if the sound input into microphone 1 cases and the sound signal from the above-mentioned amplifying circuit ceases as shown in the flat area of FIG. 2 (b), corresponding the output from rectifying circuit 8 also ceases as shown in FIG. 2 (c), current is turned off in transistor 12 and transistor 18 and then in transistor 15. Power to recording and bias circuit 3 and motor regulating circuit 20 is thereby cut, motor 21 stops and simultaneously the recording onto the tape stops.

Thus, as illustrated in the above, if a sound input is applied to microphone 1, motor 21 is actuated and the sound input on the occasion is recorded on the tape; if the sound input ceases, motor 21 stops and simultaneously the recording onto the tape stops, and by these means, the sound actuating performance is achieved. Here, tape travel causes the pulse output from pulse generator 22 as shown in FIG. 2 (f) while the output as shown in FIG. 2 (g) on each occasion of tape travel ceased. If as described above, the moving contact of switch 14 is on the side of fixed pole "a" the output from the above-mentioned multi-vibrator circuit will not influence any of the other components. Subsequently, switching the moving contact of switch 14 towards fixed pole "b" and throwing switch 16 in, generates the output as shown in FIG. 3 (a) through switch 16. The output is applied to the base of transistor 18 through capacitor 28 and activates transistor 18 and then activates transistor 15. The output shown in FIG. 3 (e) is thereby applied to recording and bias circuit 3, amplifying circuit 6 and motor regulating circuit 20, causing motor 20 to start and recording or reproducing is initiated. Simultaneously output "1" is generated from triggerable multi-vibrator circuit 25 as shown in FIG. 3 (g). Here, the tape travel cause the pulse as shown in FIG. 3 (f) from pulse generator 22. Thereafter, when the pulse output from pulse generator 22 ceases at tape-end, after rated time $T_o$, multi-vibrator circuit is inverted to "0". Then transistor 18 is de-activated and subsequently transistor 15 is de-activated. Power supply to recording and bias circuit 3, amplifying circuit 6 and motor regulating circuit 20 is thereby cut off, motor 20 stops, recording and reproducing is forced to stop, with the result thus the auto-off action is made available for the tape end. Consequently, the above type of mechanism permits the power source on-off switching circuit to be used as the auto-off circuit by means of switch operation. It means that, compared with the traditional type of tape recorder in which power source on-off circuit is provided specifically for the purpose of sound actuation, the above device enables the simplification of circuit mechanism and contributes considerably to the miniaturization of the tape recorder incorporating this type of acoustic performance. Consequently the present invention is particularly suited to the assembly of miniature tape recorders. In addition the present invention is not limited to the above embodiment but can be modified within the scope of claims.

What is claimed is:

1. A tape recorder for use with a power source comprising a tape recorder circuit; a motor circuit; an on-off switch that connects or disconnects the power source; a semiconductive switching circuit arranged to be enabled but otherwise unactuated in response to the on-off switch; a sound actuating circuit responsive directly to the on-off switch and, on the basis of sound input received, actuates and deactuates the motor circuit and starts and stops the recorder circuit; an auto-off circuit arranged to be enabled in response to both said on-off switch and said switching circuit being on for detecting tape travelling to its end and for producing a stop signal to stop the operation of the recorder circuit and motor circuit; and a switching arrangement that serves to actuate the semiconductive switching circuit in response to one of the sound actuating circuit and the auto-off circuit so that either said sound actuating circuit can turn the switching circuit on and off or said auto-off circuit can turn the switching circuit off.

2. A tape recorder as set forth in claim 1, wherein the above-mentioned sound actuating circuit comprises a microphone, an amplifying circuit and a rectifier circuit which regulates the output from the above-mentioned amplifier.

3. A tape recorder as set forth in claim 1, wherein the above-mentioned auto-off circuit includes a pulse generator which generates pulses in accordance with the tape travel amount and a retriggerable multi-vibrator circuit which works the pulse as input.

4. A tape recorder, comprising:
a recording apparatus having a tape recorder mechanism including a motor;
an on-off switch;
a voice signal responsive device operable when said switch is closed for producing a go signal in response to a voice signal and for producing a stop signal in response to absence of a voice signal;
a switching arrangement operable when said switch is closed and coupled to the recording apparatus for turning said recording apparatus on in response to a go signal and turning said recording apparatus off in response to a stop signal;
an auto-off arrangement operable when both said switch and said switching arrangement are closed and responsive to operation of the mechanism for producing a go signal when tape is being advanced and a stop signal when tape has reached its end;
switch means for alternately connecting said auto-off arrangement and said voice signal responsive device to said switching arrangement so that said switching arrangement responds either to the auto-off arrangement or to said voice signal responsive device to turn said recording apparatus on and off.

5. A recorder as in claim 4, wherein said voice signal responsive device includes an amplifier and a microphone coupled to said amplifier, and wherein said voice signal responsive device includes a rectifier coupled to said amplifier.

6. A recorder as in claims 4 or 5, wherein said auto-off arrangement includes a pulse generator for generating pulses in response to tape travel and a one-shot multivibrator having a time constant greater than the time between pulses of said pulse generator.

7. A tape recorder, comprising:
a master switch;
an auxiliary switch arrangement;
a voice signal device for producing, when enabled, on signals during existence of voice signals;
a recording apparatus for recording, when enabled, the voice signals;

an automatic-off control for producing off signals when enabled;

first circuit means for connecting said auxiliary switch arrangement and said voice signal device to said master switch for enabling the auxiliary switch arrangement and said voice signal device with the master switch, and connecting said voice signal device to said auxiliary switch arrangement to operate said auxiliary switch arrangement; and second circuit means for enabling said recording apparatus and automatic-off control with said auxiliary switch arrangement, and forming a loop by connecting the automatic-off control to said auxiliary switch arrangement so as to turn said auxiliary switch arrangement off when said automatic-off control is enabled and indicates an off signal;

said auxiliary switch arrangement including a semiconductor switch enabled by said main switch and a selector switch for connecting the semiconductor switch into said first circuit means so as to respond to the voice signal or into said second circuit means to respond to said automatic-off control.

* * * * *